United States Patent Office 3,445,219
Patented May 20, 1969

3,445,219
APPARATUS FOR FORMING GLASS ARTICLES WITH TREATING MEANS
John E. Cook, Toledo, Ohio, assignor to Owens-Illinois, Inc., a corporation of Ohio
Filed Sept. 24, 1965, Ser. No. 489,864
Int. Cl. C03b 9/34
U.S. Cl. 65—267
3 Claims

ABSTRACT OF THE DISCLOSURE

In the operation of the well-known Westlake paste mold machine for forming tumblers or the like glass articles, a gather of glass is positioned on the upper end of a spindle. The spindle is rotated end for end, while the spindle is rotated about its axis and puff air is introduced to the interior of the gather. To control the elongation of the parison through the action of gravity, cooling air is directed against the side wall of the parison from one direction. Thus, through the rotation of the parison in front of the cooling air, the skin of the parison will be rendered somewhat more viscous. The amount of cooling air will determine, to a certain extent, the rate of elongation of the parison. Also, the spindle end which is holding the upper end of the parison is cooled by air being directed against the side of the spindle. The externally applied cooling air is supplied from a single air manifold having two separate exit openings directed toward the spindle and parison. Interruption of the spindle rotation is found to be advantageous just prior to enclosing of the parison within the paste mold so as to permit a greater amount of glass to accumulate near the bottom of the parison and to permit this accumulation to elongate at a greater rate uninfluenced by centrifugal force. The cooling air which is directed against the spindle is continued during this period, but the cooling air which is directed against the side wall of the parison is discontinued in response to movement of the mold into horizontal alignment with the parison so as not to cause uneven glass thickness distribution upon final expansion of the parison in the paste mold.

---

This invention relates to a method and apparatus for controlling the cooling air on a Westlake glass blowing machine. More particularly, this invention relates to a method and apparatus for controlling the parison developing air to improve the wall weight distribution for blowing glass on a Westlake machine.

The conventional Westlake machine is best illustrated in a patent to Kadow, No. 1,527.556 issued Feb. 24, 1925. Reference may be had to this patent for the general assembly and many of the details involved in the construction of the Westlake machine.

The present invention relates specifically to the method of controlling the parison developing cooling air and to the particular air manifold mechanism and its control in relation to that portion of the cycle of the Westlake machine where the blow molds are elevated into position and closed about the parison to be blown.

In the normal operating cycle of the Westlake machine it is conventional that the spindle which carries the "gather" or "parison" is continuously rotated about its vertical axis an dthe developing air which blows against one side of the parison is constant and continuous during all portions of the forming cycle.

It has been found that in those situations where it is desirable to make glassware having relatively heavy bottoms or integral feet, it is necesary that the parison elongate to a greater extent than would be conventional in lighter weight ware manufacture. The combined effects of the rotation which exerts centrifugal force upon the parison and the blowing of cooling air against one side of the rotating parison controls the elongation of the parison by gravity to the extent desired.

With this in view, it has been the practice to stop the rotation of the parison spindle prior to the closing of the blow mold about the parison. This then permits a period in the cycle wherein the parison is not subject to centrifugal force and the glass, since it is in a plastic state, may flow by gravity downward to a greater extent. The problem created by this situation is that, with the continued blowing of cooling air against the side of the parison when the rotation of the parison is stopped results in applying an unequal chill to the parison, and its later blowing of the parison in the blow mold will result in the formation of glassware having uneven wall thickness distribution. The reason for the non-uniform side wall thickness distribution is that the uneven cooling of the parison will result in a thick portion, since in the subsequent blowing operation the hotter side of the parison will be stretched more than the cooler side will be less stretched.

With the foregoing in view, it is an object of this invention to provide a method and apparatus for controlling the parison developing cooling air.

It is an additional object of the invention to provide an air controlled mechanism for a Westlake glass blowing machine manifold.

It is a further object of this invention to improve the wall weight distribution of the glassware blown on a Westlake machine.

It is a still further object of the invention to provide a method and apparatus for forming heavy bottom glassware on a Westlake machine in which the wall weight distribution of the glassware is uniform.

Other and further objects will be apparent from the following description taken in conjunction with the annexed sheets of drawings, wherein.

In the construction shown, it will be understood that there is provided the usual central base 10 about which there is shown a portion of a turret structure 11 which carries the various parts of the glass blowing machine. It should be kept in mind that the turret structure 11 rotates at the machine speed about the base 10 with the mechanisms thereon controlled in their movements by the contour of a cam 12 having cam slots 13 and 14 formed therein. It will be understood that the cam 12 is stationary and the various moving parts of the forming machine are actuated, depending upon the radial distance of the cam slots from the center of the base 10.

Figure 1:
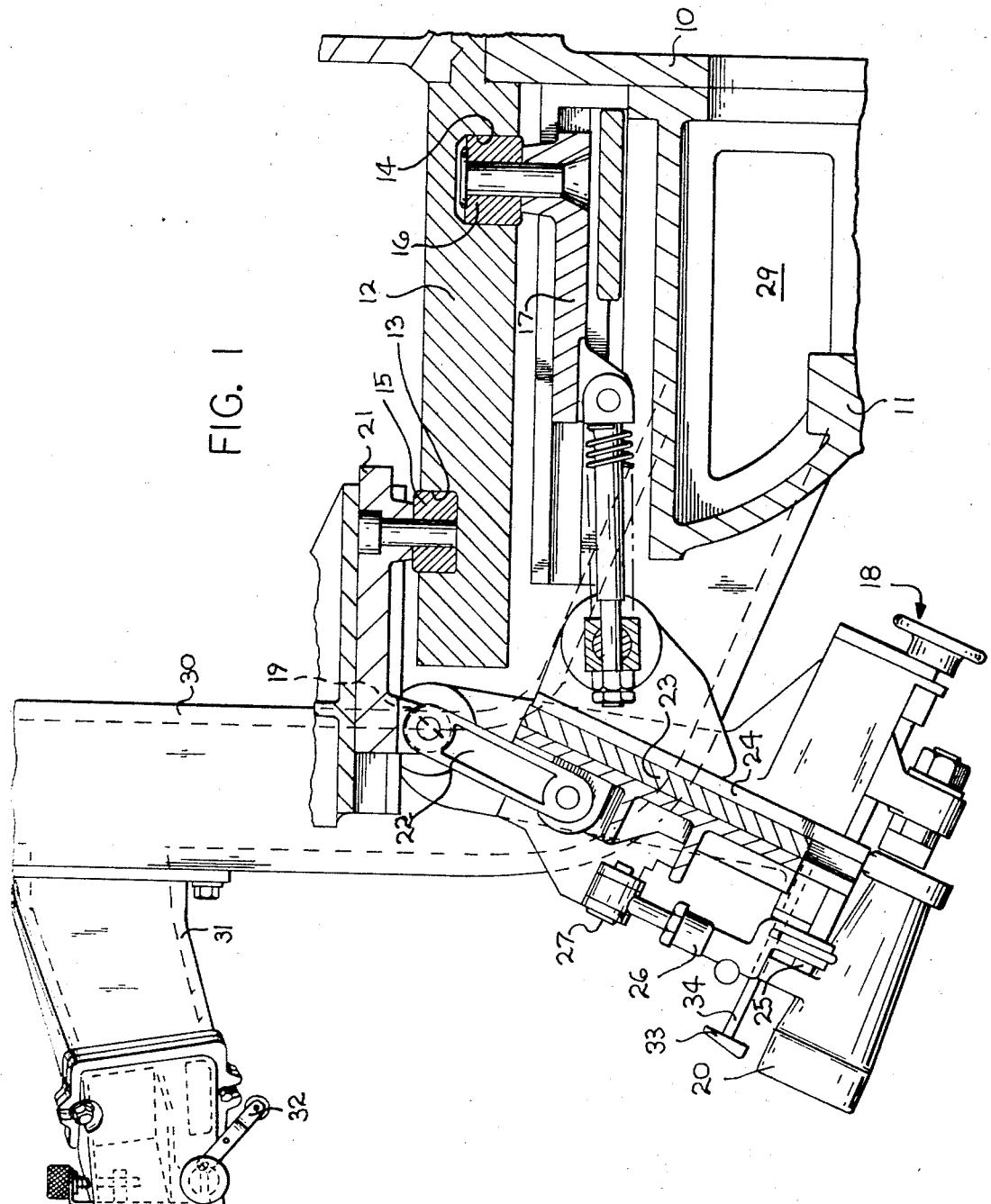
FIG. 1 is a side elevational view, partly in section, of the blow molding mechanism of the Westlake machine illustrating the position of the mechanism as the blow mold is being lifted from the water trough.

As can readily be seen when viewing FIG. 1, the cam slot 13 carries a cam follower 15 and the cam slot 14 carries a cam follower 16. The cam follower 16 is, as will be readily appreciated, in the form of a roller connected to a slide mechanism 17.

Figure 2:
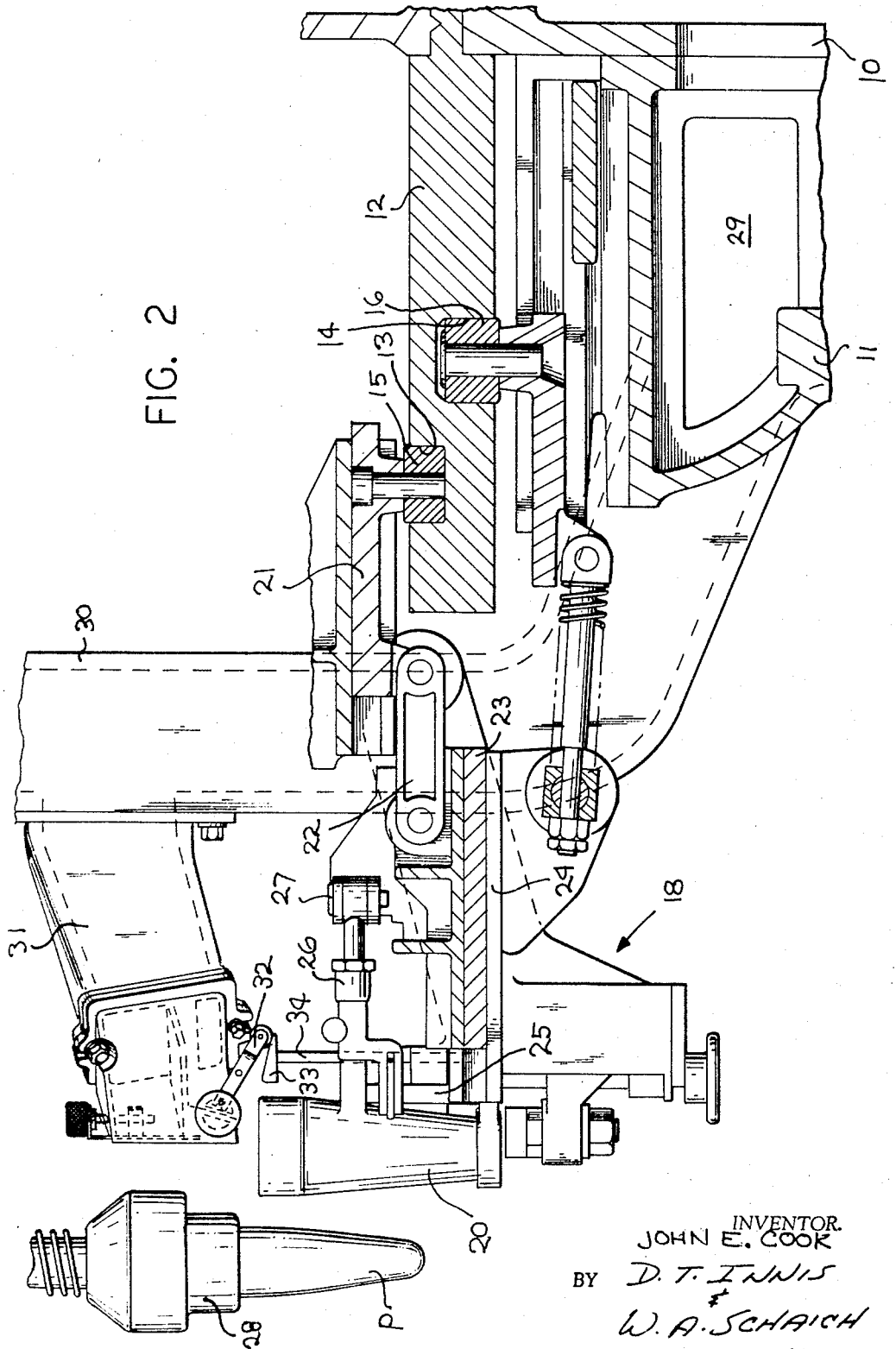
FIG. 2 is a view similar to FIG. 1, illustrating that point in the cycle of the operation of the blow molding mechanism wherein the blow mold is elevated to its uppermost position and the air manifold is actuated.

As can be readily seen when viewing FIG. 2, the cam follower 16, when moved to the left by the cam 12, will swing the mold mechanism 18 from the position shown in FIG. 1 to the position shown in FIG. 2.

Figure 3:
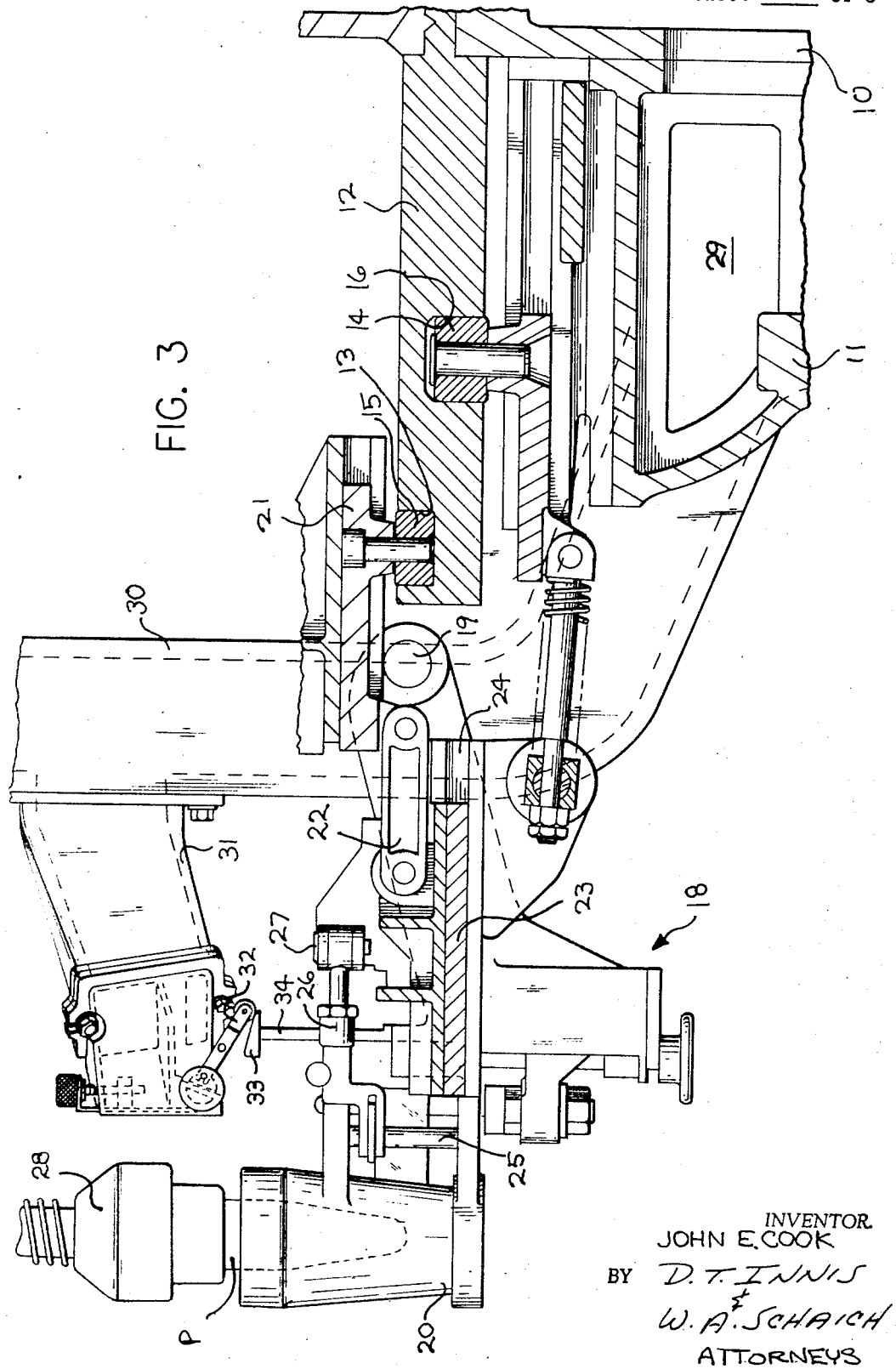
FIG. 3 is a view similar to FIG. 2, illustrating the next point in the cycle of the operation of the Westlake machine wherein the blow mold is in closed, surrounding relationship with respect to the parison to be blown and the manifold is held closed.

Thus it can be seen that the mold mechanism 18 is moved from the down position shown in FIG. 1 to the up position shown in FIG. 2 by movement of the cam follower 16 within the cam track or slot 14 of the cam 12. The mold mechanism 18 is mounted for pivotal movement about the axis 19 (best shown in FIG. 3).

It should be understood that the mold mechanism 18 comprises a pair of split molds 20, only one of which is clearly illustrated. The mold halves 20, as they are moved from the position in FIG. 1 to the position shown in FIG. 2, remain open and after raised to the position in FIG. 2, the cam follower 15 riding in the cam track 13 will be shifted to the left to the position shown in FIG. 3. This shifting movement of the cam follower 15 will operate a horizontal slide 21. The slide 21 in turn is connected by linkage 22 to a slide 23 which is adapted to slide horizontally with respect to the mold mechanism support 24.

As is clearly disclosed in the Kadow patent mentioned above, the mold halves 20 are hingedly supported with respect to the mold support 24 by a pin 25, with the operating arms 26 of the mold closing mechanism being pivotally connected at 27 to the slide 23. In this manner, upon horizontal movement of the slide 23 to the left to the position shown in FIG. 3 by the operation of cam follower 15, the mold halves 20 will be closed about a parison P. The parison P, as will readily be understood when considering the Kadow patent, is supported by a spindle 28 carried to the position shown in FIGS. 2 and 3 by the well-known spindle supporting and transporting mechanism of the conventional Westlake machine.

The above description has been given to provide a basic understanding as to the movement of the mechanisms for bringing the molds into forming position relative to the spindle and parison.

As previously stated, in those situations where it is desired that the parison be developed in a manner such that it contains a relatively large amount of glass at its lower end, it has been found necessary that the parison not be rotated by the spindle during the interval just prior to closing of the molds about the parison. Furthermore, in order to ensure that the parisons expand into the molds with uniform expansion, it is necessary that the air which is normally blowing on the side of the parison during its development prior to arrival at the blow mold position, be discontinued to prevent unequal chilling of the parison, particularly since the parison rotation is stopped. The air which is utilized in the parison development is supplied to the machine by a suitable source and is delivered to the machine in the cavity 29 from which an air conduit 30 carries the air to a manifold structure 31. It should be understood that there are a plurality of these conduits 30, one corresponding to each pair of spindles. Furthermore, there will be a pair of manifolds 31 extending from each conduit 30, with each manifold having its outer end arranged so that the air flowing therethrough will be directed against the spindle 28 and parison P.

In the past, and as disclosed in the Schutz Patent No. 2,030,328 issued Feb. 11, 1936, on a mechanism of a similar nature to that of the present invention, air which is delivered to cool the spindle and aid in the development of the parison exits through the manifold forward end and impinges on the spindle and parison. In the prior art device of the Schultz Patent No. 2,030,328, in FIGS. 51 and 52, a mechanism is shown for controlling the flow of air which is impinging on the spindle and discloses that the air as it exits from the manifold is divided into two portions, one of which, as stated before, is directed at the spindle while the other portion is directed at the parison. As explained, the Schultz patent controls the flow of air which is impinging on the spindles, having no control other than a hand setting for controlling the flow of air which is to impinge on the parison.

Applicant has found that in order to produce parisons of extended length and of required glass distribution, it is necessary that the air which is directed against the parison be shut off at the instant that the molds are raised and the rotation of the spindle is stopped. In addition to the fact that it is desirable to shut off the "developing" air when the molds are raised, an additional advantage is obtained by the shutting off of this air. This additional advantage is that during the expansion of the parison within the blow mold, the spindle, in normal operations, is spaced above the upper surface of the blow mold and that portion of the glass termed the "moil," which is formed between the spindle and the blow mold, will expand outwardly free of any confinement. In the subsequent handling of the formed article the moil portion is burned off. However, during the elongation of the parison prior to confinement and expansion within the blow mold and the formation of this moil, if the developing air is still impinged on the parison while the spindle rotation is stopped, the moil portion will expand unevenly due to the fact that a greater amount of chill will have been applied to one side. This is an undesirable condition from the standpoint that in subsequent handling of the glass article the moil portion is frequently used as one of the locating surfaces, for example, in the automatic burn-off machine loader, and if this moil portion is not symmetrical, the subsequent handling equipment may not transfer or handle the glassware from the forming machine to the burn-off machine in the proper manner. Furthermore, other operations which may be performed on the glassware, prior to the burn-off operation, may require accurate locating of the ware by the outside of the moil. For this reason it is highly desirable that the moil portion be formed as symmetrical as possible. This then is an additional reason for discontinuing the developing air impingement at the time that the spindle rotation is stopped. To accomplish this, applicant has provided a novel manifold mechanism whose operating lever 32 is controlled by the movement of an arm 33 mounted on and fixed to the mold mechanism 18 by means of an integral bar 34. As can clearly be seen when viewing FIGS. 2 and 3, upon raising the mold mechanism 18 into the position shown in FIG. 2, the lever 32 will be contacted and raised by the arm 33.

Figure 4:
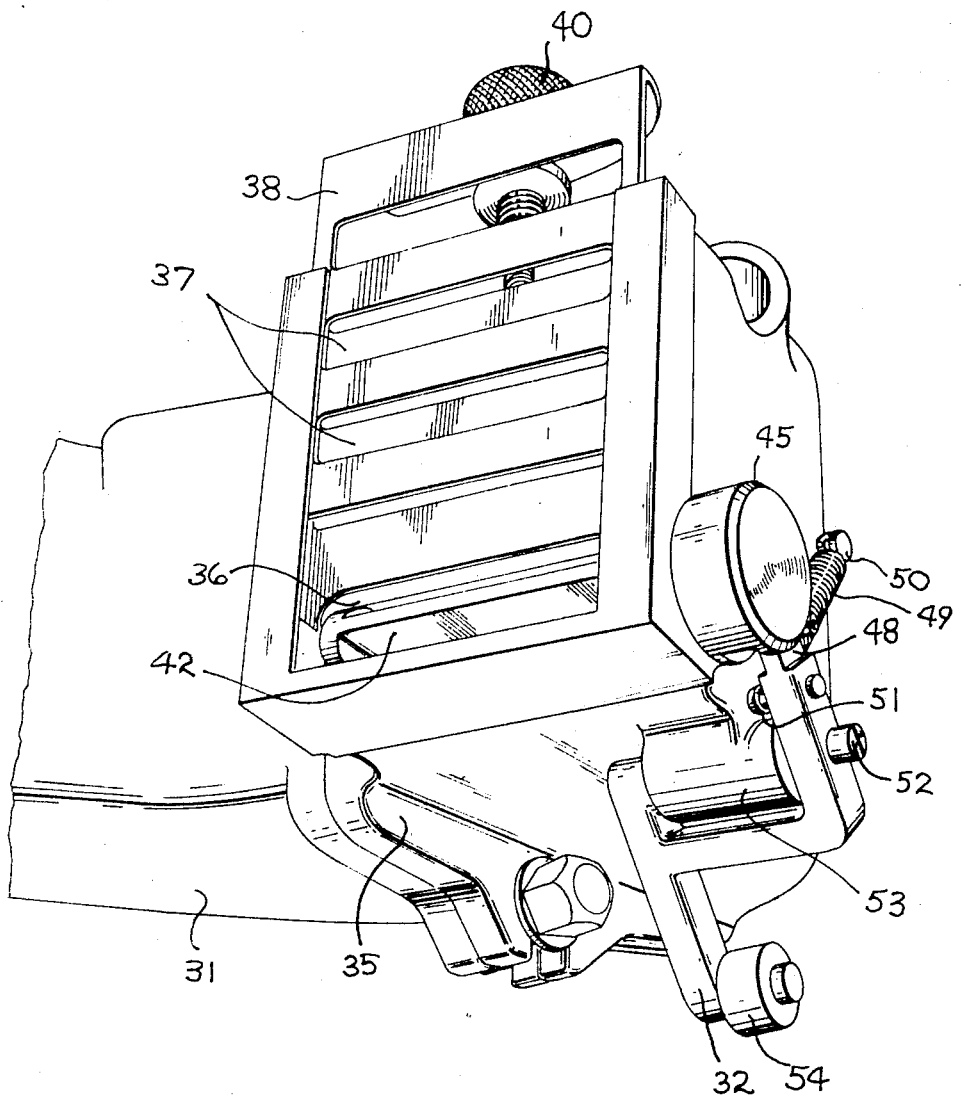
FIG. 4 is a perspective view of the air manifold mechanism of the invention.
Figure 5:
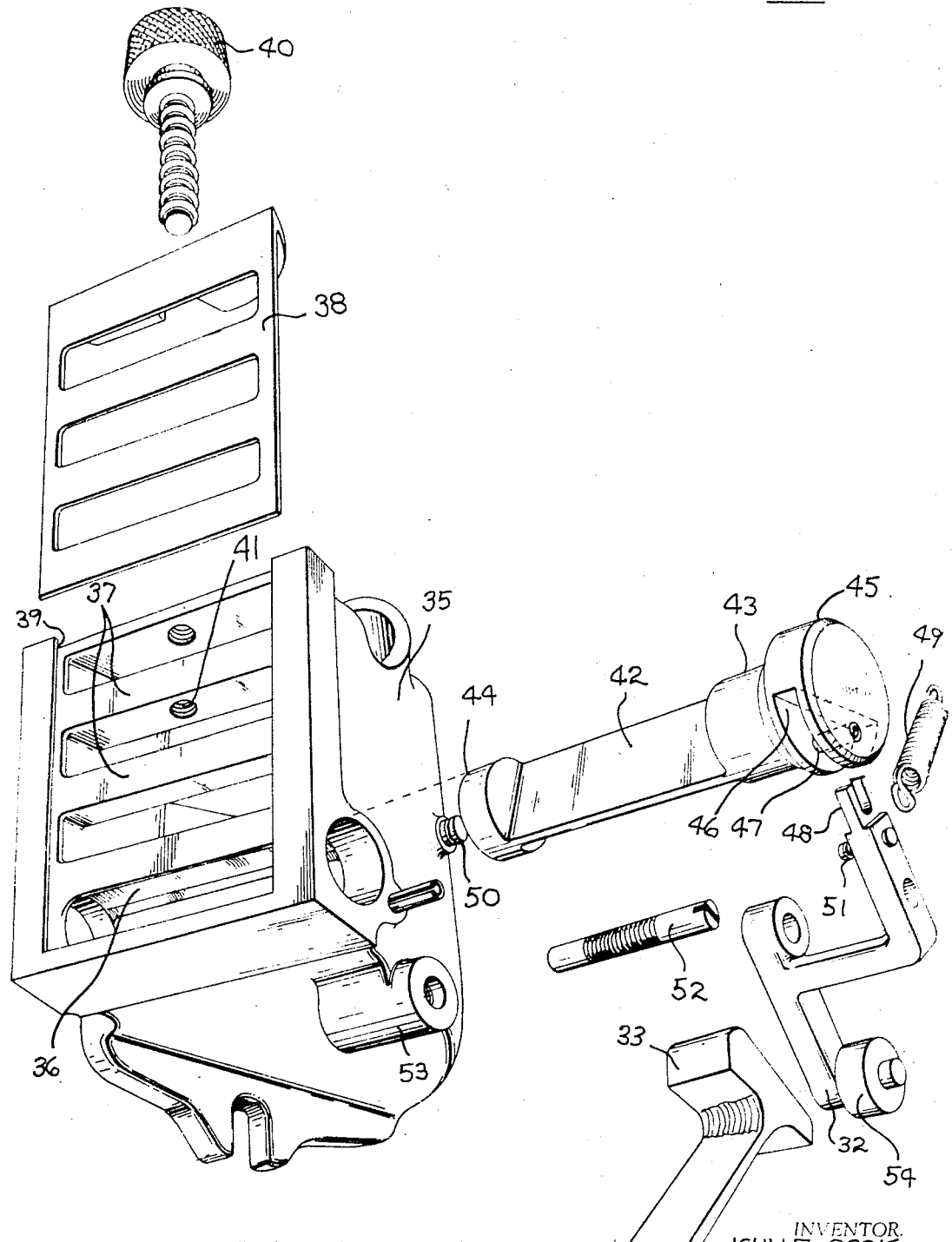
FIG. 5 is an exploded, perspective view of the mechanism of FIG. 4.

Turning now to FIGS. 4 and 5, the details of the manifold mechanism will be described.

The open forward end of the manifold member 31 is closed by a casting 35. The casting 35 is basically divided into two chambers by a horizontal wall 36, with the upper portion of the casting 35 serving to direct cooling air against the parison carrying spindle with the lower chamber directing cooling air against the side of the parison. As can best be seen when viewing FIGS. 4 and 5, the upper portion of the casting 35 at its exit opening is provided with a series of grid-like horizontal bars 37.

A complementary grid-like plate 38 is adapted to slide vertically within confining slots 39 formed along the front faces of the casting 35. The plate 38, as shown in FIG. 4, is carried by a threaded screw member 40, with the screw portion of the member 40 extending into a threaded hole 41. Thus it can be seen that by rotation of the member 40 it will adjust the vertical position of the plate 38 in relation to the grid-like forward wall of the upper portion of the casting 35. In this manner the volume of coolant exiting from the forward end of the casting 35 may be regulated. This regulation obviously controls only the coolant which is being supplied to impinge upon the spindle. The coolant which is directed against the parison side, as explained above, issues from the lower portion of the casting 35 in the area beneath the wall 36. Control of this air is important from the standpoint that when the parison spindle is stopped in its rotation, it is necessary that this air be shut off. For optimum operation, however, it is necessary that this air normally be on and that the cooling air be impinging on the side of the parison, so long as the parison is to be rotated.

With this in view, a butterfly valve member 42 in the form of a spool having rounded ends 43 and 44 which are adapted to seat within suitable bearing surfaces formed in the casting 35, may be manipulated so as to permit the air to issue through the lower portion of the casting 35 or shut the air off. The rounded end 43 of the valve 42 carries an enlarged circular boss 45 having a sector 46 thereof cut out within which is positioned a pin 47. The pin 47 is adapted to embrace the bifurcated end 48 of the pivotally mounted operating lever 32. The lever 32 is normally biased in a counter-clockwise direction by a biasing spring 49 which extends between an anchoring pin 50 on the casting 35 and an anchoring stud 51 on the lever 32. The lever 32 is piovtally mounted on an axle 52 which is threadedly received within a boss 53 formed on the casting 35. Thus it can be seen that when the arm 33 engages the lever 32 at a roller 54 thereof, the lever will be rotated in a clockwise direction which results in rotation of the valve 42 to turn the valve into a closed position.

As is clearly illustrated, the pin 47 is mounted eccentrically with respect to the valve 42 so that movement of the pin 47 by the lever 32 will cause the valve to rotate, as indicated above.

While the above description has been directed particularly to the embodiment shown in the drawings, it should be kept in mind that the invention is limited in scope only by the scope of the appended claims, and that other and further embodiments will be obvious from the foregoing description.

I claim:

1. In apparatus for forming hollow glass articles in the "paste mold" process wherein a glass parison is formed and supported at the lower end of a spindle which is rotating about its vertical axis prior to enclosure of the parison in the "paste mold," in combination therewith, of, cooling air supply means (31), a manifold means (35) connected to the air supply means, means (36) dividing said manifold into two vertically spaced sections, flow control means (42) positioned in the lower section of said manifold, operating means (54, 32, 48) connected to said flow control means and means (33) carried by the paste mold for actuating said operating means upon positioning of the paste mold into position to receive the parison.

2. In a glass forming apparatus in combination, a spindle (28) supporting a hollow glass parison (P) for movement to a forming station, a cooling air conduit means (31) for directing air toward the spindle and parison, means (36) dividing the conduit into vertically spaced outlets, valve means (42) carried by the conduit means for controlling the flow air from the lower outlet, sectional mold means (20), means (12, 14, 16, 17, 18) for supporting said mold and for elevating said mold at the forming station into registry with the parison, means (13, 15, 21, 22, 25, 26, 27) for closing said mold about the parison and means (33, 34) carried by the mold for actuating said valve means (32, 42) to shut off the cooling air upon elevation of the mold.

3. The apparatus of claim 2, further comprising presettable means (38) overlying the upper outlet of said conduit (31) for controlling the flow of air therefrom.

References Cited

UNITED STATES PATENTS

| | | | |
|---|---|---|---|
| 443,403 | 12/1890 | Neville | 65—356 |
| 1,560,062 | 11/1925 | Kucera | 65—306 XR |
| 1,949,899 | 3/1934 | Collins et al. | 65—348 XR |
| 2,284,796 | 6/1942 | Berthold | 65—306 XR |
| 2,402,475 | 6/1946 | Waterbury et al. | 65—355 |
| 3,077,096 | 2/1963 | Olson et al. | 65—348 XR |
| 3,179,508 | 4/1965 | Stapel | 65—355 XR |
| 3,350,189 | 10/1967 | Nowak | 65—84 XR |
| 3,357,810 | 12/1967 | Crouse | 65—261 XR |

DONALL H. SYLVESTER, *Primary Examiner.*

FRANK W. MIGA, *Assistant Examiner.*

U.S. Cl. X.R.

65—348, 355